(12) United States Patent
Allan et al.

(10) Patent No.: US 6,526,456 B1
(45) Date of Patent: Feb. 25, 2003

(54) DISTRIBUTION AND CONTROLLED USE OF SOFTWARE PRODUCTS

(76) Inventors: David Ian Allan, 852 Forest St., Ottawa, Ontario (CA), K2B 5P9; Gordon Edward Larose, 2417 Baseline Rd., Ottawa, Ontario (CA), K2C 0E3

( * ) Notice: Subject to any disclaimer, the term of this patent is extended or adjusted under 35 U.S.C. 154(b) by 0 days.

(21) Appl. No.: 08/674,037

(22) Filed: Jul. 1, 1996

(51) Int. Cl.⁷ .................................................. G06F 9/00
(52) U.S. Cl. .......................................... 709/328; 705/59
(58) Field of Search ................. 395/680, 710, 395/704, 685; 380/4; 705/51, 55, 59; 709/328, 332, 310; 717/124, 126, 162

(56) References Cited

U.S. PATENT DOCUMENTS

| | | | |
|---|---|---|---|
| 4,649,510 A | | 3/1987 | Schmidt ...................... 364/900 |
| 4,685,055 A | | 8/1987 | Thomas ....................... 364/200 |
| 4,891,785 A | * | 1/1990 | Donohoo ..................... 364/900 |
| 4,953,209 A | * | 8/1990 | Ryder, Sr. et al. ............ 380/23 |
| 5,083,309 A | | 1/1992 | Beysson ....................... 380/4 |
| 5,222,134 A | * | 6/1993 | Waite et al. ................... 380/4 |
| 5,274,815 A | * | 12/1993 | Trissel et al. ................. 395/700 |
| 5,291,598 A | | 3/1994 | Grundy ........................ 395/650 |
| 5,341,429 A | | 8/1994 | Stringer et al. ............... 380/23 |
| 5,349,658 A | * | 9/1994 | O'Rourke et al. .......... 395/700 |
| 5,388,211 A | | 2/1995 | Hornbuckle ................ 395/200 |
| 5,455,904 A | * | 10/1995 | Bouchet et al. ............. 195/157 |
| 5,457,798 A | * | 10/1995 | Alfredsson .................. 395/700 |
| 5,475,753 A | * | 12/1995 | Barbara et al. .............. 380/4 |
| 5,495,411 A | | 2/1996 | Ananda ....................... 364/401 |
| 5,528,753 A | * | 6/1996 | Fortin .................... 395/183.22 |
| 5,530,752 A | | 6/1996 | Rubin .......................... 380/4 |
| 5,548,645 A | | 8/1996 | Ananda ........................ 380/4 |
| 5,590,056 A | * | 12/1996 | Barritz ....................... 364/550 |
| 5,625,690 A | | 4/1997 | Michel et al. ................ 380/4 |
| 5,673,315 A | * | 9/1997 | Wolf ............................ 380/4 |
| 5,673,316 A | * | 9/1997 | Auerbach et al. ............ 380/4 |
| 5,699,428 A | * | 12/1997 | McDonnal et al. .......... 380/4 |
| 5,708,709 A | * | 1/1998 | Rose ............................ 380/4 |
| 5,752,034 A | * | 5/1998 | Srivastava et al. ........... 395/704 |
| 5,796,825 A | * | 8/1998 | McDonnal et al. ........... 380/4 |
| 5,870,606 A | * | 2/1999 | Lindsey ...................... 395/704 |
| 5,881,287 A | * | 3/1999 | Mast ........................... 395/701 |
| 5,918,004 A | * | 6/1999 | Anderson et al. ....... 395/183.14 |

FOREIGN PATENT DOCUMENTS

| | | | |
|---|---|---|---|
| EP | 0667572 | | 8/1995 |
| WO | 93/01550 | | 1/1993 |
| WO | 94/07204 | | 3/1994 |
| WO | WO 94/14114 | * | 6/1994 |

OTHER PUBLICATIONS

IBM Technical Disclosure Bulletin, "Tracing the Exported Entry Points in an OS/2 Dynamic Link Library", vol. 33, No. 6B, Nov. 1990.*

IBM Technical Disclosure Bulletin, "Execution Trace Analysis of OS/2.2*DLL Using an Intercept Layer", vol. 37, No. 3, pp. 373–375, Mar. 1994.*

* cited by examiner

Primary Examiner—Sue Lao

(57) ABSTRACT

A software product is modified so that it can be freely distributed while limiting its use to authorized subscribers. The modification includes replacing calls to relocatable subroutines in the software product by calls to redirection software, which is added to the software product together with authorizing software. A table of information on the replaced calls is supplied securely to an authorization agent, with which the authorizing software communicates on execution of the modified software product. An authorized subscriber supplies local data specific to its environment to the authorization agent, which encodes the table in dependence upon the local data and the authorizing software and supplies it to the authorized subscriber. Tampering with the authorizing software, or different local data of others, prevents use of the table. The redirection software decodes a target address for each replaced call during execution of the software, without decoding of the table or restoring the software to its original form. Alternatively, the redirection software can be supplied to the authorized subscriber by the authorization agent.

40 Claims, 3 Drawing Sheets

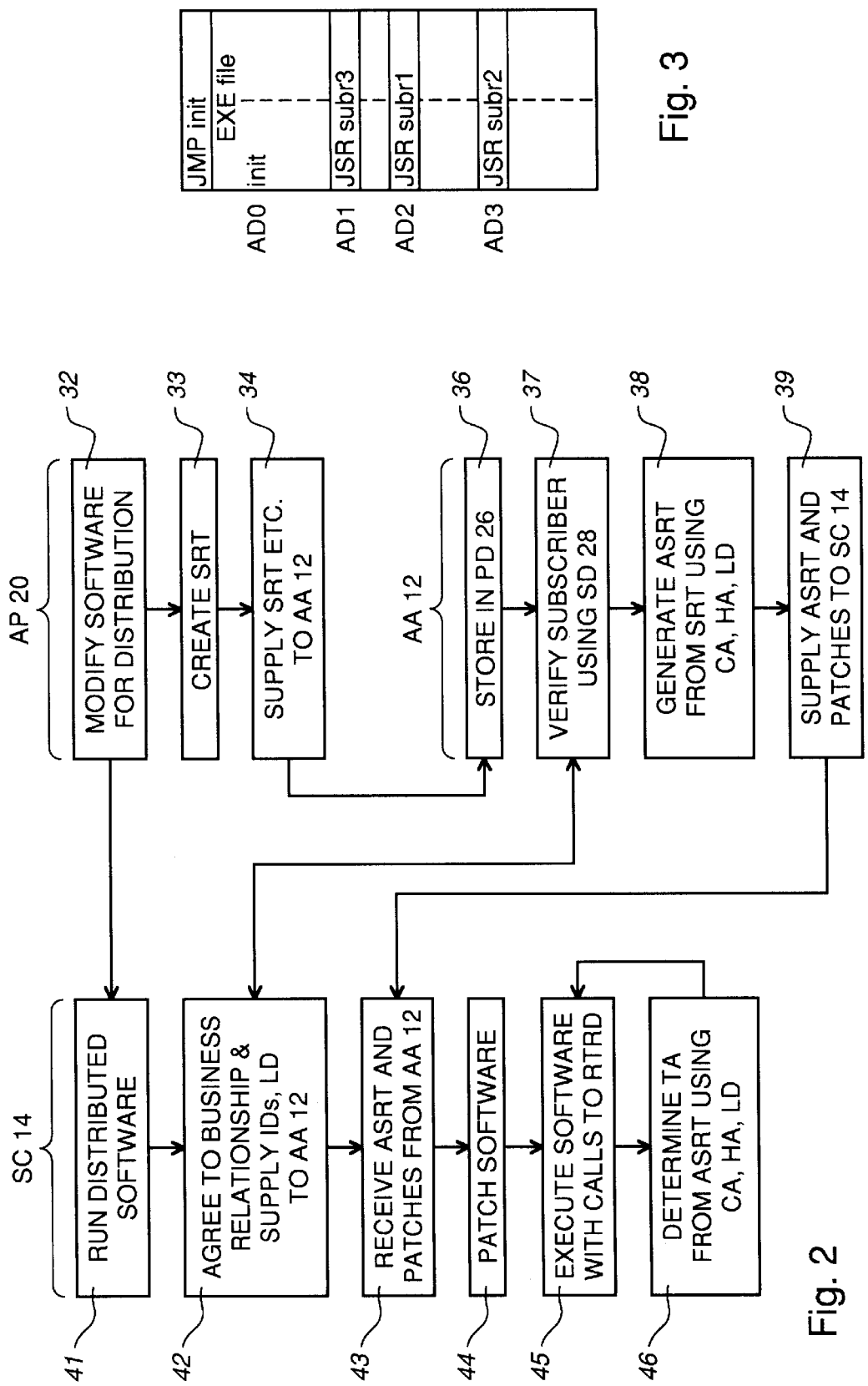

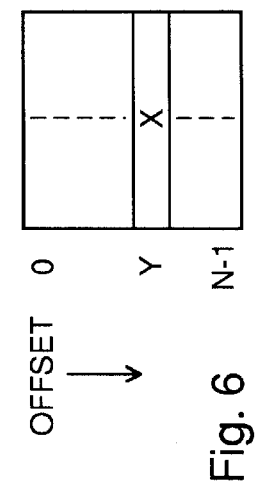
Fig. 6
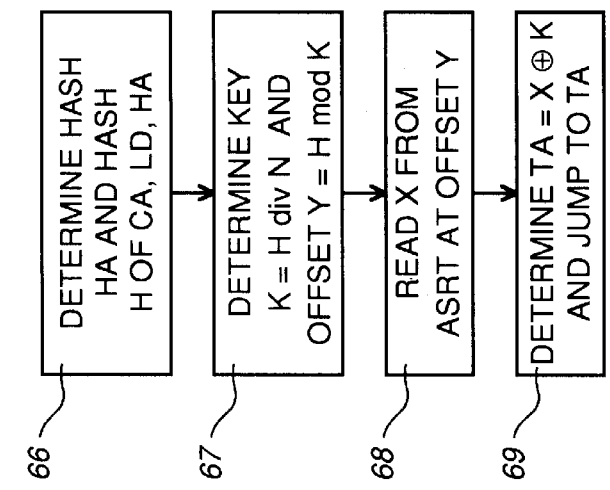
Fig. 8
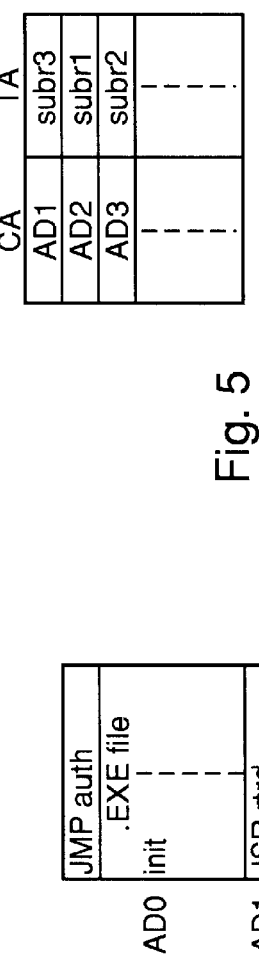
Fig. 5
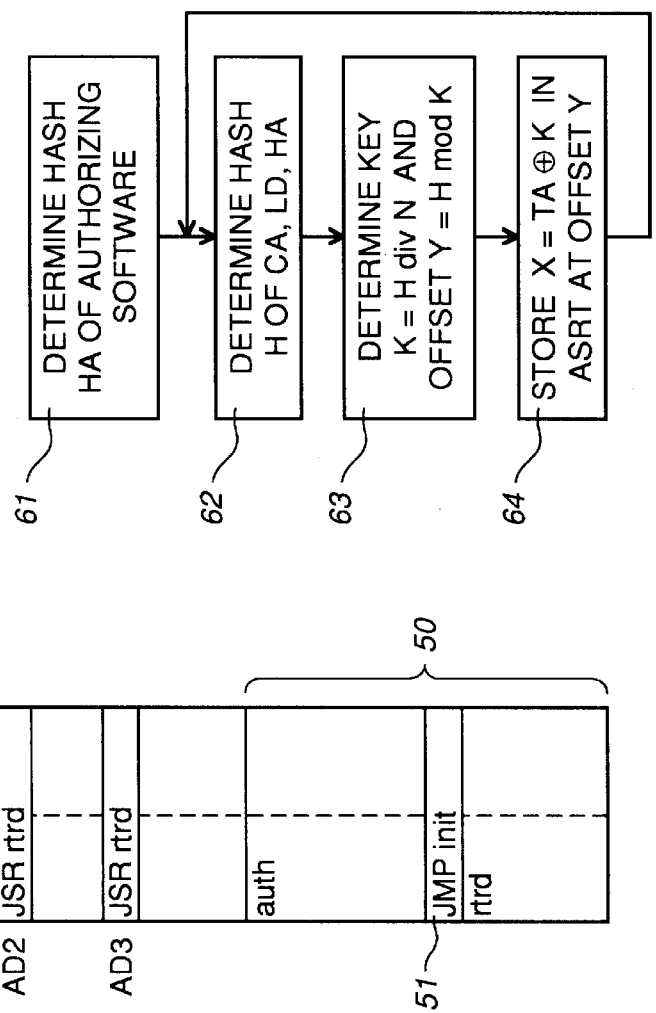
Fig. 7
Fig. 4

DISTRIBUTION AND CONTROLLED USE OF SOFTWARE PRODUCTS

This invention relates to the distribution and controlled use of software products, and is particularly concerned with what is becoming known as software rental. The term "software product" is used herein to embrace computer programs and control processes generally.

BACKGROUND OF THE INVENTION

Many procedures have been proposed and used for distribution of software products with sale of a license to use the software product, while attempting to retain control over unauthorized distribution and use of the software product. These procedures, and some of their disadvantages, include:

(i) retail sales of software product packages, involving high distribution costs in an inefficient process with a large element of risk, and low return on investment which is further reduced by unauthorized copying;

(ii) copy protection schemes which attempt to make copying difficult, but typically do not prevent copying by technically sophisticated people and reduce the usefulness of the software product to authorized people;

(iii) shareware, in which typically a subset of the software product is available for a trial period on an honour system, and there is no enforcement of the implied license;

(iv) hardware add-ons, in which use of the software product is dependent upon a physical device the most common of which is referred to as a dongel; the dongel is easily lost or broken, its use may interfere with other normal operations and is inconvenient, and the software product is open to copying by people with software knowledge who can create hardware-independent unauthorized copies of the software product; and (v) enforced registration, in which the software is serialized and only runs after a user performs a registration procedure, which may use cryptography, to bind an authorized user to a copy of the software product and help distributors locate sources of unauthorized copies; again the software product is open to copying by people with software knowledge who can create unauthorized copies bypassing the registration requirement.

These approaches do not satisfy desires for an effective method of distributing and controlling use of software products. These desires include low cost distribution of the software product without dependence on physical devices, protection of the software product from unauthorized use even by technically sophisticated people, transparency of the method to the user in operation of the software product, especially avoiding noticeable slowing of the speed of execution of the software product, applicability of the method to both new and existing software products, and an ability to provide and enforce a wide variety of business relationships with users (e.g. one-time, limited-time, and long-term use of the software product).

In Hornbuckle U.S. Pat. No. 5,388,211, issued Feb. 7, 1995 and entitled "Method And Apparatus For Remotely Controlling And Monitoring The Use Of Computer Software", there is described a software rental arrangement in which software is downloaded to a target computer from a host computer via a remote control module (RCM) which cooperates with the target computer to decrypt an encrypted key module which is critical to operation of the software. In this case the RCM constitutes a hardware add-on with disadvantages such as those described above, the arrangement having the further disadvantage of requiring changes to the operating system of the target computer, which makes the arrangement impractical.

An object of this invention is to provide an improved arrangement for the distribution and controlled use of software products.

SUMMARY OF THE INVENTION

According to one aspect, this invention provides a method of controlling use of a software product, comprising the steps of: obscuring a control thread in the software product; adding to the software product software for recovering the control thread for an authorized subscriber; and supplying to an authorized subscriber information to enable the added software, during execution of the software product, to recover the obscured control thread in a manner that is dependent upon the environment of the authorized subscriber.

The step of supplying said information to an authorized subscriber can comprise the steps of obtaining from the authorized subscriber local data dependent upon the environment of the authorized subscriber, encoding information relating to the obscured control thread in dependence upon the local data, and supplying the encoded information to the authorized subscriber. The encoding can also be dependent upon information derived from the added software for recovering the obscured control thread, and the added software can incorporate arbitrary (e.g. random) data so that decoding is dependent upon the integrity of the added software.

The software for recovering the control thread for an authorized subscriber can include redirection software responsive to said information to determine target addresses of calls to relocatable subroutines during execution of the software product, and the step of obscuring a control thread in the software product can comprise replacing calls to said relocatable subroutines by calls to the redirection software. The redirection software can be added to the software product in the step of adding software for recovering the control thread for an authorized subscriber, or it can be supplied to the authorized subscriber separately from the software product.

Another aspect of the invention provides a method of controlling use of a software product, comprising the steps of: replacing calls to relocatable subroutines in the software product by calls to redirection software; adding authorizing software to the software product, and modifying the software product to execute the authorizing software on execution of the modified software product; storing information relating to the replaced calls and the authorizing software for use by an authorization agent; in response to execution of the software product, and hence the authorizing software, by a subscriber to be authorized, communicating to the authorization agent local data dependent upon an environment in which the software is executed; in response to the local data being received by the authorization agent for an authorized subscriber, encoding the stored information relating to the replaced calls in dependence upon the local data and the authorizing software, and supplying the encoded information to the subscriber; and at the authorized subscriber, executing the software product with the replaced calls to the redirection software, the redirection software determining target addresses for the replaced calls during execution of the software product in dependence upon the encoded information, the local data, and the authorizing software.

Again, the redirection software can be either added to the software product with the authorizing software or supplied to the authorized subscriber in response to execution of the authorizing software. The step of replacing calls to relocatable subroutines in the software product by calls to redirection software can comprise the steps of overwriting the calls with arbitrary (e.g. random) data, and replacing the overwritten calls by calls to the redirection software in response to information supplied to the authorized subscriber in response to execution of the authorizing software. Arbitrary data can also be included in the authorizing software.

In a particular embodiment of the invention described in detail below, the step of encoding the stored information relating to the replaced calls in dependence upon the local data and the authorizing software comprises the step of, for each replaced call, determining a hash number H dependent upon a calling address in the stored information, the local data, and a hash of the authorizing software, and further comprises the steps of, for each replaced call, storing information for identifying a target address for the call in a table of length N at an offset into the table of H mod K, where K is equal to H div N. The information stored in the table is then conveniently produced by an exclusive-or combination of the respective target address with the respective value K.

A further aspect of the invention provides a method of modifying a software product for controlled use, comprising the steps of:

producing a distributable software product by replacing in the software product calls to relocatable subroutines by calls to redirection software, and adding authorizing software for execution on execution of the distributable software product to communicate with an authorization agent to authorize a subscriber for controlled use of the distributable software product and to provide information necessary for the redirection software to determine only during execution, in dependence upon local data relating to the authorized subscriber, a target address for each replaced call; and storing for use by the authorization agent information relating to the replaced calls to enable the authorization agent to provide said information, necessary for the redirection software to determine a target address for each replaced call, to the authorized subscriber encoded in a manner dependent upon local data supplied by the subscriber.

The redirection software can be included in the distributable software product or stored for use by the authorization agent and supplied to the authorized subscriber during execution of the authorizing software. In either case the encoding by the authorization agent of said information, necessary for the redirection software to determine a target address for each replaced call, is preferably also dependent upon the authorizing software.

BRIEF DESCRIPTION OF THE DRAWINGS

The invention will be further understood from the following description with reference to the accompanying drawings, in which:

FIG. 2 is a flow chart illustrating operations in an embodiment of the invention;

FIG. 3 is a diagram representing original software;

FIG. 4 is a diagram representing the software as modified and freely distributed in accordance with an embodiment of the invention;

FIG. 5 is a diagram representing a subroutine reference table (SRT) produced in this embodiment of the invention;

FIG. 6 is a diagram representing an authorization subroutine reference table (ASRT) produced in this embodiment of the invention;

FIG. 7 is a flow chart illustrating production of the ASRT; and:

FIG. 8 is a flow chart illustrating use of the ASRT.

DETAILED DESCRIPTION

Figure 1:
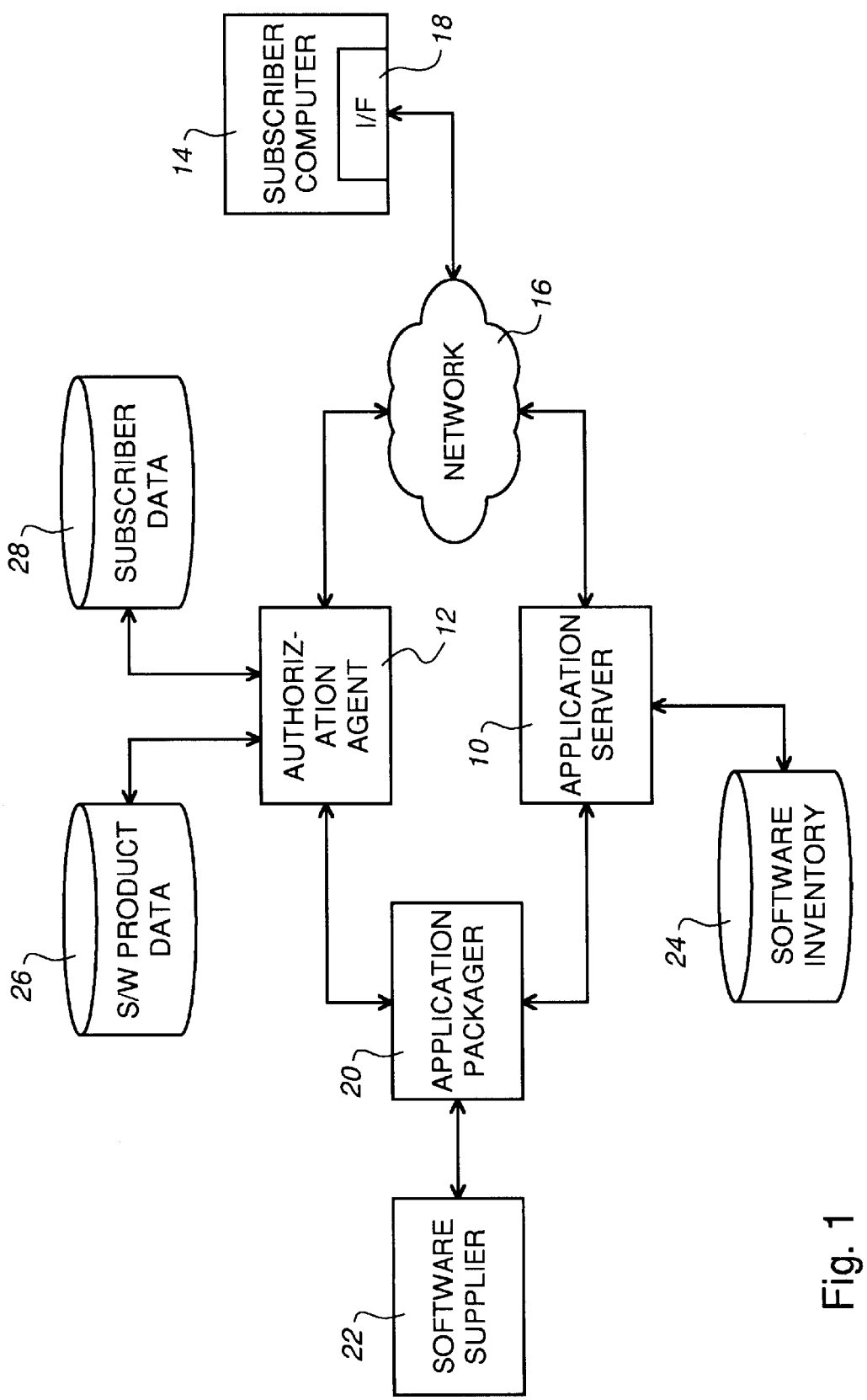
FIG. 1 schematically illustrates a network arrangement in which software is distributed and used in accordance with an embodiment of the invention.

FIG. 1 illustrates a plurality of computer units including units referred to as an application server (AS) 10, an authorization agent (AA) 12, and a subscriber computer (SC) 14 which are interconnected with one another via a network 16, for example the global computer network referred to as the Internet, the SC 14 including a network interface (I/F) 18 of known form which provides an identity of the SC as referred to below. The AS 10 and AA 12 are also interconnected, optionally via the network 16, with an application packager (AP) 20, which is supplied with a software product by a software supplier (SS) 22. The AS 10 maintains an inventory of software products in a database 24, and the AA 12 maintains software product data (PD) in a database 26 and subscriber data (SD) in a database 28.

For simplicity and clarity, FIG. 1 illustrates only one of each unit and the following description is worded correspondingly. In practice, the network arrangement would include many SCs 14 and can include multiple units 10, 12, 20, and 22 with associated databases. Correspondingly, each software product database 24 can include multiple software products, with the PD databases 26 containing related data as discussed below. Furthermore, although for generality FIG. 1 illustrates the various units of the network arrangement as being separate, and the following description is worded accordingly, it can be appreciated that different ones of the units can have arbitrary geographic locations and may be co-located or combined, and can use shared processors, in any desired manner.

The following description provides a simplified outline of a specific embodiment of the invention with reference to the units of FIG. 1, this being described subsequently in further detail.

The SS 22, for example a creator of a software product which is to be freely distributed for controlled use only by authorized subscribers, i.e. only on the SCs 14 of such subscribers, supplies the software product in a secure manner to the AP 20. The AP 20 modifies the software product in a manner described in detail below to obscure the control thread of the software and to add authorizing software to produce a freely distributable software application. This is supplied by the AP 20 to the AS 10, which stores it in the software product database 24 for free distribution or downloading via the network 16 to any SC 14. Copies of the modified software product can equally be freely distributed in any other desired manner, for example on disk. The AP 20 also generates a subroutine reference table (SRT) which contains information relating to the obscured control thread of the software product, and supplies this in a secure manner to the AA 12. The AA 12 stores the SRT, and other information relating to the software product as discussed below, in the PD database 26.

Because the control thread of the software has been obscured, the freely distributed software application is not directly executable by the SC 14. Instead, an attempt to execute the software application by the SC 14 causes the added authorizing software to run. The authorizing software communicates with the AA 12 and establishes the subscriber's agreement to a business relationship; this may be a new agreement or a continuation of a previous agreement for which the AA 12 already contains data in the SD database 28, and the nature of the business relationship is arbitrary as far as this invention is concerned. As a part of the communications with the AA 12, the SC 14 communicates information including identification of the software product and the subscriber for the respective databases 26 and 28, and local data which is discussed further below. On being satisfied that it should do so, the AA 12 retrieves the SRT for the software product from the PD database 26, creates from the SRT and the local data a unique authorization subroutine reference table (ASRT) that is algorithmically bound to the local data, and supplies this ASRT to the SC 14.

The SC 14 is now able to use the software product using the ASRT in conjunction with the local data to recover the obscured control thread of the software product as it is executed, i.e. on a run-time basis strictly within the main memory of the SC 14. As described in detail below, at the SC 14 the software product is not returned to its original form; its control thread remains obscured and the distributed form of the software product (e.g. on disk) is not modified. Because the ASRT is determined by the local data of the SC 14, a copy of the software product and ASRT together has very limited use. For example it can not be used on any other computer so that an unauthorized copy has negligible value. The local data can include information relating to date and time, so that use of the software with the ASRT on the SC 14 beyond the term of the business relationship can be prevented; the date and time can be provided by the SC 14 itself or can be derived from an independent (e.g. Trusted Time from Secure Sockets) time source on the network 16.

From the above outline, it can be seen that the invention enables an arrangement to be provided in which any software product can be freely distributed with its control thread obscured, and execution of the software is permitted by any authorized subscriber in a manner which is tied to that subscriber without the software product being returned to its original form. The software product is thereby protected by ensuring that a copy of the software being executed on one computer, even if captured with the aid of hacker's tools such as memory snapshots, is practically useless on any other computer, and even at unauthorized times on the same computer. As described above the arrangement is provided in a network which expedites distribution of the software product and authorization of its use, but it can be seen that the same principles can apply to any other distribution and authorization arrangement.

The following description explains in detail the embodiment of the invention outlined above, with reference to the steps of the flow chart in FIG. 2 and the illustrations in FIGS. 3 to 8.

In FIG. 2, steps 32 to 34 performed by the AP 20 are shown at the top right, steps 36 to 39 performed by the AA 12 are shown at the bottom right, and steps 41 to 46 performed by the SC 14 are shown at the left. As explained in the outline above, a software product is supplied to the AP 20. The steps 32 and 33 performed by the AP 20 are shown sequentially for convenience but in practice are carried out simultaneously.

A structure of the original software product is represented in a very simple manner in FIG. 3, which shows that the software product includes an execute (.EXE) file including an initial routine init at a location or address AD0 to which there is an initial jump instruction (JMP init). The software product includes at various locations or addresses (AD1, AD2, etc.) numerous calls (e.g. JSR subr1) to relocatable subroutines which are executed in normal running of the software product. Typically, as is well known, the software product may include hundreds or thousands of subroutine calls, the numbers of subroutines and subroutine calls increasing with increasing complexity of the software product. FIG. 3 indicates the extensive remainder of the software product by a vertical dashed line.

In the step 32, the AP 20 modifies the software product for distribution. FIG. 4 shows, in a similar manner to FIG. 3, the modified software product which can be freely distributed, for example via the AS 10 and network 16 as described in the outline above.

As shown by FIG. 4, the AP 20 modifies the software product by adding, at the end of the executable file, authorizing software 50 to the original software product, the authorizing software comprising a software launch authorizing module auth and a run-time redirect (RTRD) module rtrd. The AP 20 may also add random data to obscure the function and appearance of the software. The AP 20 also modifies the original software product by replacing the initial jump instruction by a jump instruction to the authorizing module (JMP auth), which itself ends its execution with a jump 51 to the original initial routine (JMP init). Furthermore, the AP 20 modifies the original software product by replacing some or all of the calls to relocatable subroutines at the addresses AD1, AD2, etc. by calls to the RTRD module (JSR rtrd). This replacement obscures the control thread of the software product, and it can be appreciated that the degree of obscurity increases with increasing numbers of replaced subroutine calls and with increasing complexity of the software product.

Identification by the AP 20 of the calls to relocatable subroutines to be replaced by calls to the RTRD module can be carried out either with or without detailed knowledge of the software product from the SS 22; in the latter case disassemblers and other known software tools can be used to locate these calls. In either case time-critical subroutines can also be identified and replacement of calls to these subroutines can be avoided to avoid undesirably slow eventual execution of the software by the SC 14 as described below. Generally, a significant proportion of calls to relocatable subroutines can be identified and replaced in the manner illustrated in FIG. 4 and described above to obscure the control thread of the software product to a sufficient extent for protection without significantly slowing its eventual execution.

The authorizing software 50 is created by the AP 20 for the software product for example by combining a generic template for various software products with random data, conveniently in the form of randomly generated numbers distributed within the authorizing software so that a hash-of the authorizing software is substantially altered.

In the step 33, the AP 20 creates the SRT. As shown in FIG. 5, the SRT is a table which correlates, for each subroutine call of the original software product that has been replaced in the step 32 as described above, the calling address (CA) and the called subroutine address, referred to here as a target address (TA). Thus as illustrated in FIG. 5 and as derived from the illustration in FIG. 3, the SRT stores the calling address AD1 together with the target address of the subroutine subr3 which is called from this address, the calling address AD2 together with the target address of the subroutine subr1 which is called from this address, and so on for each replaced subroutine call. Equivalently, return addresses, to which returns are made after execution of the respective called subroutines, could be stored in the SRT instead of the calling addresses.

In the step 34 the AP 20 supplies securely to the AA 12, and in the step 36 the AA 12 stores in the PD database 26, the SRT together with other information relating to the software product, including the identity of the software product. This other information further includes comprehensive knowledge of the authorizing software (and any random obscuring data) for the software product so that the AA 12 can produce a hash of the authorizing software with minor alterations such as being loaded in different memory locations.

As described above, the modified software product produced by the AP 20 is distributed freely and can be run by the SC 14 as shown by step 41 in FIG. 2. This causes the module auth of the authorizing software to be executed to enable the subscriber to agree to or continue a business relationship at the step 42. As discussed above the nature of the business relationship is arbitrary as far as this invention is concerned, and it is well known in the art how this can be established and managed by the AA 12.

In the step 42 the module auth running at the SC 14 supplies to the AA 12 information including identities (IDs) of the software product and of the subscriber, and the local data (LD) referred to above. The LD generally defines an environment (e.g. location and date) that is specific to the SC 14 and optionally the business relationship (e.g. limited-time use of the software product) agreed to. By way of example, the LD can be a number or set of numbers derived from such local parameters as the network identity (this can also be the subscriber identity) of the SC 14 as provided by the interface 18, and the current date provided locally by the SC 14 or globally from the network 16 as already mentioned. It may include other data, for example a location in the memory of the SC 14 at which the module auth is loaded, which is also specific to the environment of the SC 14.

At the step 37, the AA 12 verifies authenticity of the subscriber using the SD database 28 in any of a variety of known ways. In the subsequent step 38 the AA 12 generates the ASRT from the SRT using the calling addresses CA, a hash HA of the authorizing software that incorporates any additional random data, and the LD in the manner described in detail below. FIG. 6 illustrates the ASRT, and FIG. 7 shows a flow chart of steps followed by the AA 12 to produce the ASRT.

As shown in FIG. 6, the ASRT comprises a table of length N locations each for storing a value X at an offset Y from the start of the table. N is an integer of about the same order as the number of replaced subroutine calls; for example N is a prime number greater than the number of replaced subroutine calls.

Referring to FIG. 7, the AA 12 performs a step 61 to determine the hash HA of the authorizing software; to the extent that this depends on the location in the memory of the SC 14 of the module auth this information is supplied from the SC 14 to the AA 12 in the step 42 of FIG. 2 as part of the LD as already indicated above.

In respect of each of the replaced subroutine calls, i.e. each pair of addresses CA and TA in the SRT as shown in FIG. 5, the AA 12 performs steps 62 to 64 shown in FIG. 7. In the step 62, the AA 12 determines a hash number H from the respective calling address CA, the local data LD, and the hash HA. The hash number H comprises a relatively large number of bits, for example 128 bits. In the step 63, the AA 12 divides the hash number H by the length N of the ASRT to produce an integer quotient, which constitutes a key K=H div N, and a remainder Y=H mod K which is necessarily less than N and constitutes the offset into the ASRT as indicated above. In the step 64, the AA 12 performs an exclusive-or operation (modulo-2 addition, represented by the symbol $\oplus$) of the respective target address TA from the SRT and the key K to produce the value X which is stored in the ASRT at the offset Y as indicated above. The purpose of this process using the key K is to obscure the ASRT; other techniques can instead be used to achieve this purpose.

The above steps provide a possibility of duplicate mappings of entries in the SRT to entries in the ASRT. This possibility is reduced as the length N of the ASRT is increased in comparison to the number of replaced subroutine calls and hence entries in the SRT. In the event of a duplicate mapping, i.e. if the step 63 results in an offset Y for the ASRT that has already been used, then the AA 12 records this separately for patching the software in the SC 14 as described further below.

Referring again to FIG. 2, the ASRT is supplied from the AA 12 and received by the SC 14 as shown by the steps 39 and 43 respectively. In addition, information for any software patches required by duplicate mappings of the ASRT are provided to the SC 14 from the AA 12, this information comprising the pair of addresses CA and TA from the SRT for each of the duplicate mappings. As the duplicate mappings and hence the patches can generally differ for different executions of the software product, they could conceivably be captured and collated over time to reduce the security of the software product. This is avoided by sizing the ASRT, i.e. selecting the number N in relation to the number of replaced subroutine calls, so that the number of duplicate mappings is relatively small. After the steps 39 and 43, communications between the SC 14 and the AA 12 are unnecessary (until the software product is run again by the SC 14).

In the step 44, the SC 14 effects any necessary patches of the distributed software product by replacing the relevant JSR rtrd calls with the original subroutine calls using the information supplied from the SRT by the AA 12. In the step 45, the SC 14 then transfers control back to the original software product via the JMP init instruction 51 (FIG. 4), with subroutine calls to the RTRD module rtrd as shown by the software structure in FIG. 4.

For each such subroutine call, in the step 46 in FIG. 2 the RTRD determines the target address TA for the respective subroutine from the ASRT at the SC 14, using the respective calling address CA available from the memory stack of the SC 14, the hash HA which it determines in the same manner as this is determined by the AA 12 in the step 61 as described above, and the local data LD. A jump is made to the subroutine at the determined target address TA, and execution of the software continues at the step 45.

FIG. 8 illustrates in more detail the operation of the RTRD module rtrd for each replaced subroutine call, comprising steps 66 to 69. In the step 66, the RTRD determines the hash HA in the same manner as this is determined by the AA 12 in the step 61 as described above, and determines the hash number H from the respective calling address CA, the local data LD, and the hash HA in exactly the same manner as for the AA 12 in the step 62 as described above. In the step 67, the RTRD produces the key K and the offset Y in exactly the same manner as for the AA 12 in the step 63 as described above. In the step 68, the RTRD reads the value X from the ASRT at the offset Y. In the step 69, the RTRD performs an exclusive-or operation of the value X read from the ASRT and the key K to reproduce the target address TA of the relevant subroutine, and a jump is made to this target address. The execution of the software continues in normal manner until the next JSR rtrd replacement instruction is encountered, for which a similar sequence of steps is performed.

The embodiment of the invention described above provides a number of significant advantages:

As already discussed, the original software product is not restored at the SC 14, so that it is not vulnerable to unauthorized copying and use. Copies of the distributed software product can be freely made, but they can not be executed successfully without agreement to a business relationship as described above for the step 42. A copy of the ASRT for the SC 14 is of negligible value for any other computer, because it is algorithmically related to the environment of the particular SC 14 for which it is provided. Different local data LD on any other computer would result in the RTRD producing incorrect target addresses, and replicating the local data of one computer on another computer is impractical because the LD of each computer includes, for example, the uniquely determined network identity of the computer.

Dependence of the ASRT on the date and/or time, which as described above can be globally provided via the network 16, enables the SC 14 for which the ASRT is provided to have a limited-time use of the software product. In this respect it is observed that this dependence can incorporate any desired date and/or time granularity, so that the ASRT can be provided to be valid for an arbitrary period. The authorizing software module auth can be arranged so that, for subsequent executions of the same software product after an initial execution in which an ASRT is provided, the same ASRT is used for the period that it is valid, and so that a new business relationship is offered, and if agreed to a new ASRT is provided, to the subscriber after this period.

Because the ASRT is also dependent upon the hash HA of the authorizing software (modules auth and rtrd) including any additional random data, alteration of the authorizing software also renders the ASRT useless (incorrect target addresses would be produced), so that the authorizing software distributed with the software product is effectively safeguarded from tampering, including inspection by software tools that use code insertion techniques.

The information in the ASRT itself is also obscured by the nature of this table. More specifically, the determination of the offset Y into the table in dependence upon the hash H is different for each entry in the ASRT, and hence for each replaced subroutine call, so that analysis of the ASRT is difficult. This difficulty is further compounded by the exclusive-or operations used at step 64 to produce, and at step 69 to use, the entries in the ASRT. The key K used for the exclusive-or operation is a byproduct of determining the offset Y for the ASRT, so that its determination adds little incremental latency to the RTRD module rtrd. However, this makes a significant difference to the complexity of the ASRT, which would be an important table for analysis by people attempting to copy the software product.

Even for a complex software product for which there may be a large number of replaced subroutine calls, it can be seen that the size of the ASRT can be relatively small. In addition, the authorizing software added to the distributed software product can be much smaller than the original size of most software products, so that its size and system resource usage can have a negligible impact on the distribution and use of the software product.

It can be appreciated that the determination of the target address for each replaced subroutine call which is redirected to the RTRD adds processing time to the software product and therefore slows its execution. As already discussed, the replacement of subroutine calls to time-critical subroutines in the software product can be avoided, so that undue slowing of the execution of the software product is avoided. With appropriate selection of which ones and how many of the subroutine calls of the original software product are replaced as described above, this desirably being done with an understanding of the software product and the cooperation of the software supplier, this slowing of the execution of the software product due to the RTRD can be such that it is imperceptible to the subscriber, while ensuring that the control thread of the software product is effectively obscured. However, it is observed that the invention does not necessarily require knowledge of the software product, nor is it dependent on any particular computer operating system or programming language; consequently, it can easily be applied to existing, and possibly inadequately documented or understood, software products.

It can also be appreciated that a knowledge of the manner in which the software product is protected as described above does not detract from the protection itself; in other words the protection provided against unauthorized use of the software product is not dependent upon any trade secret that would be vulnerable to disclosure.

In the embodiment of the invention described above, each replaced subroutine call is replaced by a call to the RTRD module rtrd. Alternatively, these subroutine calls can be replaced in the distributed software product by arbitrary or random data. In this case the arbitrary or random data can be replaced by the calls to the RTRD module rtrd under the control of the module auth on execution of the software product at the SC 14 (i.e. in memory at run time) in the software patching step 44 in FIG. 2, the calling addresses AD1, AD2, etc. for these replacements being provided by the AA 12 from the SRT as additional parts of the steps 39 and 43 in FIG. 2.

As a further alternative, instead of being included in the freely distributed software product as part of the authorizing software, the RTRD module rtrd may itself be downloaded from the AA 12 on execution of the launch authorizing module auth. This alternative also allows the RTRD module to be varied over time and for different locations.

Considered generally, the embodiments of the invention described above include the steps of:

1. Obscuring the control thread in the distributed software product, and adding to the distributed software product software for recovering the control thread for an authorized subscriber.
2. Supplying to an authorized subscriber information to enable the added software, during execution of the software product, to recover the obscured control thread in a manner that is dependent upon the environment of the authorized subscriber.

In the above-described embodiments of the invention, step 1 is carried out by the AP 20, and step 2 involves the ASRT (embodying the control thread information from the SRT and information derived from the environment of the SC 14) supplied from the AA 12 to the SC 14. However, the invention is generally applicable to any arrangement in which these steps are carried out, and in particular is applicable regardless of the manner in which authorization of a subscriber is established or the manner in which the information to enable the obscured control thread to be recovered and locally bound is communicated to the authorized subscriber. Thus the invention is also applicable to any other method of controlling access to the SRT data, or otherwise communicating the information of the SRT to the authorized subscriber, in dependence upon the environment of the authorized subscriber.

Thus, for example, instead of the AA 12 being supplied with the SRT and producing the ASRT on authorization of a subscriber as described above, a suitably secured version of the SRT can be included as part of the freely distributed software product. Each authorized subscriber can then be supplied (from an AA 12 or in any other desired manner) with a decryption key which, when coupled with local information, enables the distributed software product to be executed only in the environment of the respective subscriber, with substantially the same results as in the embodiment of the invention described above. In this case the security of the SRT must be sufficient that its information can not be easily recovered.

Thus although particular embodiments of the invention have been described in detail, it should be appreciated that numerous modifications, variations, and adaptations may be made without departing from the scope of the invention as defined in the claims.

What is claimed is:

1. A method of controlling use of a software product, comprising the steps of:

obscuring a control thread in the software product;

adding to the software product authorizing software and redirection software for recovering the control thread for an authorized subscriber; and supplying to an authorized subscriber, in response to execution of the authorizing software on execution of the software product, encoded subroutine reference information to enable the redirection software, during execution of the software product, to recover the obscured control thread in a manner that is dependent upon the environment of the authorized subscriber;

wherein the redirection software is responsive to said encoded subroutine reference information to determine target addresses of calls to relocatable subroutines during rum-time execution of the software product, and the step of obscuring a control thread in the software product comprises replacing calls to said relocatable subroutines by calls to the redirection software, whereby at the authorized subscriber the software product is executed in dependence upon the redirection software without the software product ever being restored to its original form.

2. A method as claimed in claim 1 wherein the step of supplying said encoded subroutine reference information to an authorized subscriber comprises the steps of obtaining from the authorized subscriber local data dependent upon the environment of the authorized subscriber, and encoding subroutine reference information relating to the obscured control thread in dependence upon the local data to produce the encoded subroutine reference information.

3. A method as claimed in claim 1 wherein the step of supplying said encoded subroutine reference information to an authorized subscriber comprises the step of encoding subroutine reference information relating to the obscured control thread in dependence upon information derived from the authorization software.

4. A method as claimed in claim 3 and including the step of incorporating arbitrary data in the authorization software.

5. A method of controlling use of a software product, comprising the steps of:

replacing calls to relocatable subroutines in the software product by calls to redirection software, and providing the redirection software;

adding authorizing software to the software product, and modifying the software product to execute the authorizing software on execution of the modified software product;

storing subroutine reference information relating to the replaced calls, and information relating to the authorizing software, for use by an authorization agent;

in response to execution of the software product, and hence the authorizing software, by a subscriber to be authorized, communicating to the authorization agent local data dependent upon an environment in which the software is executed;

in response to the local data being received by the authorization agent for an authorized subscriber, encoding the stored subroutine reference information relating to the replaced calls in dependence upon the local data and the information relating to the authorizing software, and supplying the encoded subroutine reference information to the authorized subscriber; and at the authorized subscriber, executing the software product with the replaced calls to the redirection software, the redirection software determining target addresses for the replaced calls during run-time execution of the software product in dependence upon the encoded subroutine reference information, the local data, and the authorizing software, whereby at the authorized subscriber the software product is executed in dependence upon the redirection software without the software product ever being restored to its original form.

6. A method as claimed in claim 5 wherein the redirection software is added to the software product with the authorizing software.

7. A method as claimed in claim 5 wherein the redirection software is supplied to the authorized subscriber in response to execution of the authorizing software.

8. A method as claimed in claim 7 wherein the step of replacing calls to relocatable subroutines in the software product by calls to the redirection software comprises the steps of overwriting the calls with arbitrary data, and replacing the overwritten calls by calls to the redirection software in response to information supplied to the authorized subscriber in response to execution of the authorizing software.

9. A method as claimed in claim 5 and including the step of incorporating arbitrary data in the authorizing software.

10. A method as claimed in claim 5 wherein the step of encoding the stored subroutine reference information relating to the replaced calls in dependence upon the local data and the authorizing software comprises the step of, for each replaced call, determining a hash number H dependent upon a calling address in the stored subroutine reference information, the local data, and a hash of the authorizing software.

11. A method as claimed in claim 10 wherein the step of encoding the stored subroutine reference information further comprises the steps of, for each replaced call, storing information for identifying a target address for the call in a table of length N at an offset into the table of H mod K, where K is equal to H div N.

12. A method as claimed in claim 11 wherein, for each replaced call, the information stored in the table is produced by an exclusive-or combination of the respective target address with the respective value K.

13. A method of modifying a software product for controlled use, comprising the steps of:

producing a distributable software product by replacing in the software product calls to relocatable subroutines by calls to redirection software, and adding the redirection software and authorizing software for execution on execution of the distributable software product to communicate with an authorization agent to authorize a subscriber for controlled use of the distributable software product and to provide encoded subroutine reference information necessary for the redirection software to determine only during run-time execution of the software product, in dependence upon local data relating to the authorized subscriber, a target address for each replaced call, whereby at the authorized subscriber the software product is executed in dependence upon the redirection software without the software product ever being restored to its original form; and storing for use by the authorization agent subroutine reference information relating to the replaced calls to enable the authorization agent to provide said encoded subroutine reference information to the authorized subscriber, the stored subroutine reference information being encoded in a manner dependent upon local data supplied by the subscriber.

14. A method as claimed in claim 13 wherein the encoding by the authorization agent of the stored subroutine reference information is also dependent upon the authorizing software.

15. A method of modifying a software product for controlled use, comprising the steps of:

producing a distributable software product by replacing in the software product calls to relocatable subroutines by calls to redirection software, and adding authorizing software for execution on execution of the distributable software product to communicate with an authorization agent to authorize a subscriber for controlled use of the distributable software product, to provide the redirection software to the authorized subscriber, and to provide encoded subroutine reference information necessary for the redirection software to determine only during run-time execution of the software product, in dependence upon local data relating to the authorized subscriber, a target address for each replaced call, whereby at the authorized subscriber the software product is executed in dependence upon the redirection software without the software product ever being restored to its original form; and storing for use by the authorization agent subroutine reference information relating to the replaced calls to enable the authorization agent to provide said encoded subroutine reference information to the authorized subscriber encoded in a manner dependent upon local data supplied by the subscriber.

16. A method as claimed in claim 15 wherein the encoding by the authorization agent of the stored subroutine reference information is also dependent upon the authorizing software.

17. A method of controlling use of a software product, comprising the steps of:

producing a distributable software product by replacing in the software product calls to relocatable subroutines by calls to redirection software, and providing in the distributable software product authorizing software for execution on execution of the distributable software product;

providing the redirection software to be called by said calls to redirection software;

storing subroutine reference information relating to the replaced calls for use by an authorization agent;

on execution of the authorizing software by a subscriber to be authorized, communicating to the authorization agent local data relating to the subscriber and/or an environment in which the software is executed;

in response to the local data being received by the authorization agent for an authorized subscriber, encoding the stored subroutine reference information relating to the replaced calls in dependence upon the local data and supplying the encoded subroutine reference information to the authorized subscriber; and at the authorized subscriber, executing the software product with the replaced calls to the redirection software, the redirection software determining target addresses for the replaced calls during run-time execution of the distributable software product in dependence upon the encoded subroutine reference information and the local data, whereby at the authorized subscriber the software product is executed in dependence upon the redirection software without the software product ever being restored to its original form.

18. A method as claimed in claim 17 wherein the redirection software is provided in the distributable software product.

19. A method as claimed in claim 17 wherein the redirection software is supplied to the authorized subscriber in response to execution of the authorizing software.

20. A method as claimed in claim 19 wherein calls to relocatable subroutines in the software product are replaced by calls to the redirection software by the steps of:

overwriting the calls with arbitrary data; and replacing the overwritten calls by calls to the redirection software in response to information supplied to the authorized subscriber in response to execution of the authorizing software.

21. A method as claimed in claim 20 wherein the encoding of the stored subroutine reference information relating to the replaced calls, and the determination of target addresses by the redirection software, are also dependent upon the authorizing software.

22. A method as claimed in claim 17 wherein the encoding of the stored subroutine reference information relating to the replaced calls, and the determination of target addresses by the redirection software, are also dependent upon the authorizing software.

23. A method as claimed in claim 22 and including the step of incorporating arbitrary data in the authorizing software.

24. A method as claimed in claim 22 wherein the step of encoding the stored subroutine reference information relating to the replaced calls comprises the step of, for each replaced call, determining a hash number H dependent upon a calling address in the stored subroutine reference information, the local data, and a hash of the authorizing software.

25. A method as claimed in claim 24 wherein the step of encoding the stored subroutine reference information relating to the replaced calls further comprises the steps of, for each replaced call, storing information for identifying a target address for the call in a table of length N at an offset into the table of H mod K, where K is equal to H div N.

26. A method as claimed in claim 25 wherein, for each replaced call, the information stored in the table is produced by an exclusive-or combination of the respective target address with the respective value K.

27. A method of producing a distributable software product for controlled use in accordance with the method of claim 17, comprising the steps of:

obscuring calls to relocatable subroutines in the software product, and adding authorizing software to produce the distributable software product; and providing subroutine reference information relating to the obscured calls;

wherein the authorizing software is arranged for execution upon execution of the distributable software product to enable authorized use of the distributable software product in dependence upon said subroutine reference information relating to the obscured calls and local data for the authorized use.

28. A method as claimed in claim 27 wherein the step of obscuring calls to relocatable subroutines comprises replacing calls with arbitrary data.

29. A method as claimed in claim 27 wherein the step of obscuring calls to relocatable subroutines comprises replacing calls with calls to redirection software for determining target addresses of the calls to relocatable subroutines during execution of the distributable software product.

30. A method as claimed in claim 29 and including the step of adding the redirection software to the software product.

31. A method as claimed in claim 27 wherein the step of providing subroutine reference information relating to the obscured calls comprises providing information for correlating calling or return addresses of the obscured calls with target addresses of the respective called subroutines.

32. A method as claimed in claim 31 and further including the step of encoding the subroutine reference information for correlating said addresses in dependence upon the local data for an authorized use.

33. A method as claimed in claim 32 wherein the encoding of the subroutine reference information for correlating said addresses is also dependent on information derived from the authorizing software.

34. A method as claimed in claim 27 and including the step of providing arbitrary data within the authorizing software.

35. A method as claimed in claim 27 wherein the subroutine reference information relating to the obscured calls is provided with the distributable software product.

36. A method as claimed in claim 27 wherein the subroutine reference information relating to the obscured calls is provided separately from the distributable software product for access on execution of the authorizing software.

37. A method of using a distributable software product provided for controlled use in accordance with the method of claim 17, comprising the steps of:

providing local data relating to the environment for authorized use of the distributable software product;

executing the authorizing software to obtain subroutine reference information relating to the obscured calls encoded in dependence upon the local data; and accessing the relocatable subroutines in dependence upon the obtained subroutine reference information and the local data during run-time execution of the distributable software product.

38. A method as claimed in claim 37 wherein the encoding of said subroutine reference information relating to the obscured calls is also dependent upon information derived from the authorizing software, and the step of accessing the relocatable subroutines comprises determining this information from the authorizing software in the distributable software product.

39. A method of enabling authorized use of a distributable software product provided for controlled use in accordance with the method of claim 17, comprising the steps of:

receiving the subroutine reference information relating to the replaced calls, said subroutine reference information correlating calling or return addresses of the replaced calls with the target addresses of the respective called subroutines;

receiving local data for an authorized use of the distributable software product;

encoding said subroutine reference information in dependence upon the local data; and supplying the encoded subroutine reference information to enable the authorized use of the distributable software product.

40. A method as claimed in claim 39 wherein the encoding of said subroutine reference information is also dependent on information derived from the authorizing software.

* * * * *